(12) United States Patent
Yokoyama et al.

(10) Patent No.: US 8,395,742 B2
(45) Date of Patent: Mar. 12, 2013

(54) LIQUID CRYSTAL DISPLAY

(75) Inventors: Ryoichi Yokoyama, Tokyo (JP); Michiru Senda, Tokyo (JP)

(73) Assignee: Samsung Display Co., Ltd. (KR)

( * ) Notice: Subject to any disclaimer, the term of this patent is extended or adjusted under 35 U.S.C. 154(b) by 1533 days.

(21) Appl. No.: 11/928,804

(22) Filed: Oct. 30, 2007

(65) Prior Publication Data

US 2008/0186271 A1 Aug. 7, 2008

(30) Foreign Application Priority Data

Feb. 6, 2007 (KR) .................. 10-2007-0012209

(51) Int. Cl.
*G02F 1/1343* (2006.01)

(52) U.S. Cl. .................. 349/145; 349/38; 349/39

(58) Field of Classification Search .............. 349/38–39, 349/145
See application file for complete search history.

(56) References Cited

FOREIGN PATENT DOCUMENTS

| JP | 02-277027 A | 11/1990 |
| JP | 03-269521 A | 12/1991 |
| JP | 11-064893 A | 3/1999 |
| JP | 2000-284304 A | 10/2000 |
| JP | 2002-156644 A | 5/2002 |
| JP | 2003-150080 | 5/2003 |
| JP | 2007-043621 A | 2/2007 |

*Primary Examiner* — Phu Vu
(74) *Attorney, Agent, or Firm* — Innovation Counsel LLP

(57) ABSTRACT

A liquid crystal display having an improved pixel aperture ratio includes vertical scan lines disposed between adjacent pixels, video signal lines disposed between adjacent pixels, and sub-capacitor lines disposed between adjacent pixels while regularly and repeatedly crossing the vertical scan lines.

27 Claims, 9 Drawing Sheets

LIQUID CRYSTAL DISPLAY

CROSS-REFERENCE TO RELATED APPLICATION

This application relies for priority upon Korean Patent Application No. 2007-12209 filed on Feb. 6, 2007, the disclosure of which is incorporated herein by reference.

BACKGROUND

1. Field of Invention

The present invention relates to a liquid crystal display and, more particularly, to a liquid crystal display employing an active matrix mode.

2. Description of the Related Art

In a liquid crystal display employing an active matrix mode, the pixels are regularly arranged in the directions in which the vertical scan lines and the video signal lines extend. Each pixel is provided with a TFT (thin film transistor), a pixel electrode and a sub-capacitor (a storage capacitor). The thin film transistor includes an input electrode connected to the video signal line and an output electrode connected to the pixel electrode. The pixel electrode faces a common electrode with the liquid crystals between them. The sub-capacitor is electrically connected between the output electrode of the thin film transistor and the pixel electrode in a row arrangement to control the tilting state or alignment of the liquid crystals.

Japanese unexamined Patent Publication No. 2003-150080 discloses a layout of sub-capacitors and sub-capacitor lines in a liquid crystal display employing dot inversion driving. A vertical scan line passes through the center of the pixels aligned in the direction of the scan line. The thin film transistors and the sub-capacitors are alternately arranged at both sides of the vertical scan line. One of two sub-capacitor lines is connected to the sub-capacitor arranged at one side of the vertical scan line and the other sub-capacitor line is connected to the sub-capacitor arranged at the other side of the vertical scan line. Sub-capacitor voltages having phases opposite to each other and varying during the off period of the thin film transistor are provided to the two sub-capacitor lines.

In the liquid crystal display described in the above patent, two sub-capacitor lines are disposed corresponding to one vertical scan line. In addition, the vertical scan line and sub-capacitor line are disposed in the pixel and overlap each other so that the effective aperture ratio of the pixel is reduced and the transmittance of the liquid crystal display is lowered.

SUMMARY

The present invention, according to one aspect thereof, provides a liquid crystal display having an improved aperture ratio as well as better light-transmittance.

In one embodiment, a liquid crystal display comprises an array of pixels, a plurality of vertical scan lines located between adjacent pixels in one direction, a plurality of video signal lines located between adjacent pixels in another direction, and a plurality of sub-capacitor lines located between adjacent pixels in the same direction as the vertical scan lines while regularly and repeatedly crossing the vertical scan lines.

In another embodiment, a liquid crystal display comprises an array of pixels, a plurality of vertical scan lines located between adjacent pixels and disposed in a first conductive layer, a plurality of video signal lines located between adjacent pixels and disposed in a second conductive layer, a plurality of sub-capacitor lines located between adjacent pixels and disposed in the first conductive layer, and a plurality of cross lines connecting the vertical scan lines and the sub-capacitor lines to repeatedly cross each other at a predetermined interval and disposed in the second conductive layer.

In another embodiment, a liquid crystal display comprises a plurality of pixels arranged in two directions, wherein each pixel has a thin film transistor, a pixel electrode connected to one main electrode of the thin film transistor and a sub-capacitor electrically connected between the thin film transistor and the pixel electrodes, a plurality of vertical scan lines between adjacent pixels disposed in a first conductive layer and electrically connected to control electrodes of thin film transistors so that the control electrodes are alternately disposed in the upper and lower pixel region with respect to each vertical scan line, a plurality of video signal lines disposed between adjacent pixels electrically connected to another main electrode of each thin film transistor and disposed in a second conductive layer above the first conductive layer, a plurality of sub-capacitor lines disposed between adjacent pixels, and a plurality of cross lines for regularly and repeatedly connecting the vertical scan lines and the sub-capacitor lines to cross each other in the second conductive layer.

In another embodiment, a liquid crystal display comprises a first substrate having an array of pixels, a vertical scan line, which is formed on the first substrate, a sub-capacitor line, which is formed on the first substrate and spaced apart from the vertical scan line, a plurality of video signal lines, which are formed on the vertical scan line so as to define the pixels together with the vertical scan line, and a second substrate facing the first substrate wherein the pixels are classified as a first group and a second group with respect to a virtual line parallel to the first direction, and the vertical scan line or the sub-capacitor line extends in a serpentine manner with respect to the virtual line between the first group and the second group.

BRIEF DESCRIPTION OF THE DRAWINGS

The above and other advantages of the present invention will become readily apparent by reference to the following detailed description when considered in conjunction with the accompanying drawings, in which.

DETAILED DESCRIPTION

Hereinafter, a liquid crystal display employing an active matrix mode according to embodiments of the present invention will be explained with reference to accompanying drawings. In particular, the present invention can be applied to a small-sized and a medium-sized liquid crystal displays. In this case, the small-sized and medium-sized liquid crystal displays signify the liquid crystal displays including liquid crystal display units having a size of 20 inch or less provided in a mobile phone, a wireless device, a digital camera, or a notebook personal computer.

First Embodiment—(System Configuration of Liquid Crystal Display)

Figure 4:
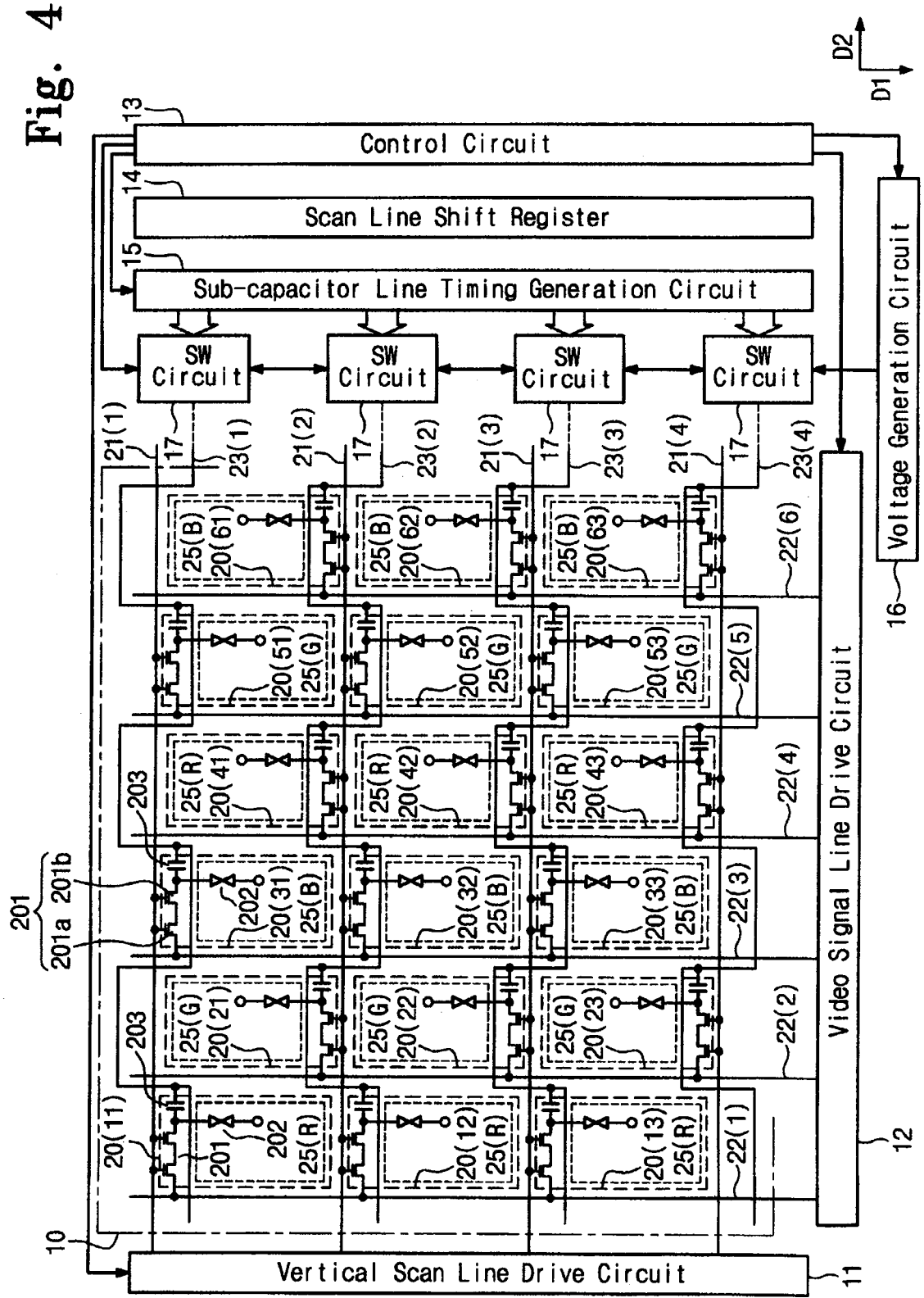
FIG. 4 is a system circuit diagram of the liquid crystal display according to the first embodiment of the present invention.

As shown in FIG. 4, a liquid crystal display employing an active matrix mode and a dot inversion drive mode according to the first embodiment of the present invention is provided with a liquid crystal display unit 10, a vertical scan line drive circuit 11, a video signal line drive circuit 12, a control circuit 13, a scan line shift register 14, a sub-capacitor line timing generation circuit 15, a voltage generation circuit 16 and a switching circuit 17.

The liquid crystal display unit 10 is provided with a plurality of pixels 20 (20(11), 20(12), ... 20(21), 20(22), ...), a plurality of vertical scan lines 21 (21(1), 21(2), ... ), a plurality of video signal lines 22 (22(1), 22(2), ... ) and a plurality of sub-capacitor lines 23 (23(1), 23(2) ... ).

The pixels 20 are regularly arranged in the first direction D1 and the second direction D2 crossing the first direction D1. The pixels (20(11), 20(12),) are longitudinally and transversely arranged having a respective pitch.

Each pixel 20 includes a serial circuit in which a thin film transistor 201 is electrically connected to a pixel capacitor 202. The pixel 20 is further provided with a sub-capacitor 203. One main electrode (for example, an output electrode) of the thin film transistor 201 is electrically connected to both one electrode of the sub-capacitor 203 and a pixel electrode of the pixel capacitor 202. The other main electrode (for example, an input electrode) of the thin film transistor 201 is electrically to a video signal line 22. The vertical scan line 21 is electrically connected to a gate electrode of the thin film transistor 201. The thin film transistor 201 according to the first embodiment of the present invention includes two thin film transistors 201a and 201b that are electrically connected to each other in series, but the present invention is not limited thereto.

The pixel capacitor 202 includes the pixel electrode, a common pixel electrode facing the pixel electrode, and liquid crystals interposed between the pixel electrode and the common pixel electrode. The other electrode of the sub-capacitor 203 is electrically connected to the sub-capacitor line 23. The detailed structure of the thin film transistor 201, the pixel capacitor 202 and the sub-capacitor 203 will be explained later with reference to FIG. 3.

The vertical scan line (gate signal line) 21 is disposed between pixels that are adjacent to each other in the first direction D1, and extends in the second direction D2. For example, the vertical scan line 21(2) is disposed between the pixel 20(11) and the pixel 20(12) that are adjacent to each other in the first direction D1. The vertical scan line 21 is connected to the vertical scan line drive circuit 11, and the vertical scan line drive circuit 11 turns on the transistor 201 of the pixel 20 connected to the vertical scan line 21 by scanning the vertical scan line 21. The vertical scan line drive circuit 11 is connected to the control circuit 13 and its operation is controlled by means of the control circuit 13.

A video signal line (horizontal signal line) 22 is disposed between pixels 20 that are adjacent to each other in the second direction, and extends in the first direction D1. For example, the video signal line 22(2) is disposed between the pixel 20(11) and the pixel 20(21) that are adjacent to each other in the second direction D2. The video signal line 22 is connected to the video signal line drive circuit 12, and the video signal line drive circuit 12 transmits a video signal to the pixel capacitor 202 of the pixel 20 connected to the video signal line 22 through the thin film transistor 201 by scanning the video signal line 22. The video signal line drive circuit 12 is connected to the control circuit 13, and its operation is controlled by means of the control circuit 13.

The sub-capacitor line 23 is disposed between pixels 20, in which the corresponding vertical scan lines 21 are aligned, and extends in the second direction D2 while regularly and repeatedly crossing the corresponding vertical scan line 21. For example, the sub capacitor 23(2) is disposed between pixels 20(11) and 20(12) in which the vertical scan line 21(2) is aligned, and regularly crosses the vertical scan line 21(2). In other words, the vertical scan line 21(2) and a sub-capacitor line 23(2) extend in the second direction D2 while regularly and repeatedly crossing each other.

The sub-capacitor line 23 is connected to a switching circuit (SW circuit) 17, and the switching circuit 17 is connected to both the voltage generation circuit 16 and the control circuit 13 through the sub-capacitor line timing generation circuit 15 and the scan line shift register 14. The switching operation of the switching circuit 17 is controlled by control circuit 13 through the scan line shift register 14 and the sub-capacitor line timing generation circuit 15. Similarly, the operation of the voltage generation circuit 16 is controlled by control circuit 13. The switching circuit 17 provides various types of voltages (for example, a sub-capacitor signal or an overdrive signal), which are generated and supplied by the voltage generation circuit 16 to the sub-capacitor 203 of the pixel 20 through the sub-capacitor line 23.

Arrangement Layout of Pixels

As shown in FIG. 4, in the liquid crystal display unit 10 according to the first embodiment of the present invention, the pixels (20(11), 20(21), 20(31), 20(41), ... ) are positioned in the region between the vertical scan lines 21(1) and 21(2) that are adjacent to each other in the first direction D1. The pixels (20(11), 20(31), ... ), which are arranged at odd number positions in the second direction D2, are connected to one vertical scan line 21(1), and the pixels 20(21), 20(41), ... and 20(2n1), which are arranged at even number positions, are connected to the other vertical scan line 21(2). That is, pixels 20(11), 20(21), 20(31), 20(41), ... and 20(n1) are alternately connected to one side and the other side of the vertical scan line 21 at every pixel 20 (at every one dot).

The liquid crystal display 1 according to the first embodiment of the present invention is a color liquid crystal display, and a color filter 25 is disposed on each pixel 20. The color filters 25 of red (R), green (G) and blue (B) are assigned to the pixels 20(11), 20(21) and 20(31) that are arranged in the second direction D2, respectively. The color filters 25 of red (R), green (G) and blue (B) are also assigned to the pixels of the next row 20(41), 20(51) and 20(61) that are arranged in the second direction D2, respectively. The red (R) color filters 25 are assigned to the pixels (20(11), 20(12), ... ) that are arranged in the first direction D1, respectively. The green (G) color filters 25 are assigned to the pixels (20(21), 20(22), ... ) that are adjacent to the pixels 20(11) and 20(12), and arranged in the first direction D1. The blue (B) color filters 25 are assigned to the pixels (20(31), 20(32), . . . ) that are adjacent to the pixels 20(21) and 20(22) and arranged in the first direction D1.

The pixels (20(11), 20(21), 20(31), 20(41), . . . ) are located in the region between the vertical scan lines 21(2) and 21(3) that are adjacent to each other in the first direction D1. The pixels (20(12), 20(32), . . . ) in the odd-numbered positions in the second direction D2 are connected to one vertical scan line 21(2), and the pixels (20(22), 20(42), . . . ) in the even-numbered positions are connected to the other vertical scan line 21(3). The connection relationship of the pixels 20 located between the vertical scan lines 21 at the following rows is the same as in the previous rows.

In the region between the adjacent video signal lines 22(1) and 22(2), the pixels (20(11), 20(12), . . . ) are connected to one video signal line 22(1).

In the region between the adjacent video signal lines 22(2) and 22(3), the pixels (20(21), 20(22), . . . ) are connected to one video signal line 22(2). The connection relationship of the pixels 20 arranged between the video signal lines 22 at the following columns is the same as that of the previous columns.

Detailed Sectional Structure and Plan Structure of Liquid Crystal Display

Figure 3:
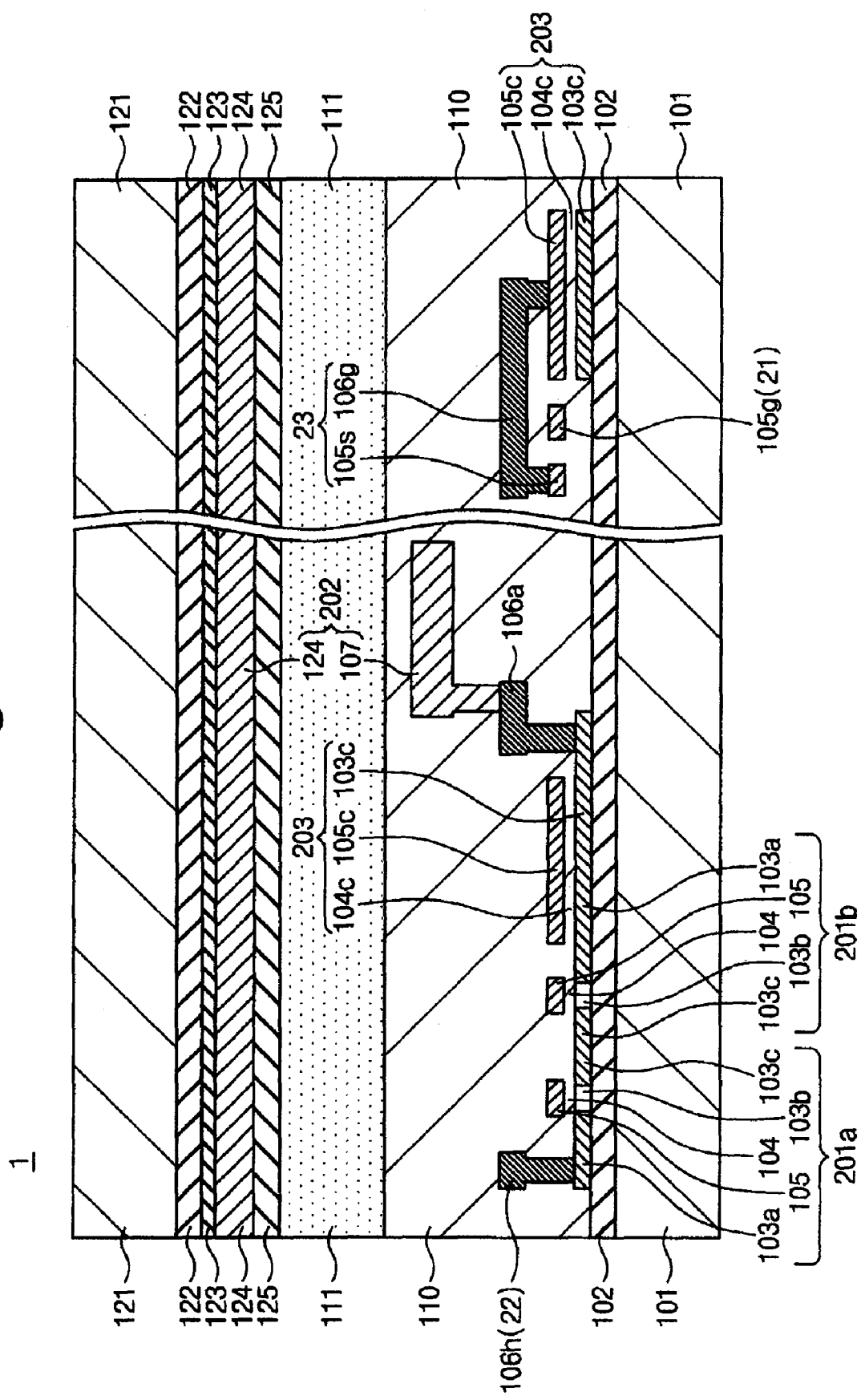
FIG. 3 is a sectional view taken along lines F3A-F3A and F3B-F3B shown in FIG. 2.

Hereinafter, the sectional structure and the plan structure of the liquid crystal display 1 according to the first embodiment of the present invention will be explained in detail. As shown in FIG. 3 (on the left), the liquid crystal display 1 is provided with an insulating substrate 110 having a rectangular shape, an opposite substrate 121 installed on the top surface of the insulating substrate 101 and having a rectangular shape smaller than the insulating substrate 101, and liquid crystals 111 interposed between the insulating substrate 101 and the opposite substrate 121.

Since the liquid crystal display 1 according to the first embodiment of the present invention employs a transmission type liquid crystal display, the insulating substrate 101 and the opposite substrate 121 include transparent glass.

One thin film transistor 201a of the thin film transistor 201 forming the pixel 20 is formed on the insulating substrate 101 by interposing a base insulating layer 102 therebetween, and is provided with a channel area 103b, a pair of main electrodes (input electrode or output electrode) 103a and 103c installed at both sides of the channel area 103b, respectively, a gate insulating layer 104 formed on the channel area 103b, and a control electrode (gate electrode) 105 formed on the gate insulating layer 104. The other thin film transistor 201b of the thin film transistor 201 has the same structure as one thin film transistor 201a. The other thin film transistor 201b is formed on the insulating substrate 101 by interposing the base insulating layer 102 therebetween and is provided with a channel area 103b, a pair of main electrodes 103a and 103c installed at both sides of the channel area 103b, respectively, a gate insulating layer 104 formed on the channel area 103b, and a control electrode 105 formed on the gate insulating layer 104.

The channel area 103b and the main electrode 103a are formed of the same conductive layer and include the same semiconductor thin film. Main electrodes 103a of the thin film transistor 201a and 201b, which are adjacent to each other, are shared by the thin film transistor 201a and 201b. For example, the semiconductor thin film may include a polycrystal silicon layer (low temperature polysilicon layer), which is formed at a low temperature and does not exert an influence upon the insulating substrate 101 during the manufacturing process. In addition, the semiconductor thin film may include amorphous silicon.

According to the first embodiment of the present invention, the main electrode 103a is an n-type electrode, so the thin film transistor 201 is an n-channel conductivity type. The control electrode 105 may include a gate material. For instance, the control material may include a single layer including any one selected from the group consisting of a polycrystal silicon layer, a metal layer having a high-melting point formed at a low temperature by a sputtering, a silicide layer having a high-melting point, a MoW layer and an aluminum alloy layer. In addition, the gate material may include a composite layer obtained by combining at least two of the polycrystal silicon layer, the metal layer, the silicide layer, the MoW layer and the aluminum alloy layer.

The other main electrode 103a of the thin film transistor 201a is connected to the video signal line 106h(22) installed on a conductive layer of the control electrode 105. The video signal line 106h may include a material having specific resistance lower than that of each control electrode 105 of the thin film transistors 201a and 201b. For example, the video signal line 106h may include an aluminum alloy layer such as an aluminum thin film obtained by adding silicon or copper thereto. In addition, the aluminum alloy layer is not limited to the single layer, but a lower portion thereof can include a barrier metal layer, or an upper portion thereof can include an anti-reflection layer capable of preventing reflection during the exposure process of the photolithography process.

The sub-capacitor 203 includes a first electrode (lower electrode) 103c, a dielectric layer 104c formed on the first electrode 103c, and a second electrode (upper electrode) 105c. The first electrode 103c is integrally formed with the other main electrode 103a of the thin film transistor 201b so as to be shared. That is, the first electrode 103c and the main electrode 103a are formed of the same conductive layer, and include the same conductive material. The dielectric layer 104c is formed together with each gate-insulating layer 104 of the thin film transistors 201a and 201b, and includes an insulating material the same as that of each gate-insulating layer 104. The second electrode 105c is formed together with each control electrode 105 of the thin film transistors 201a and 201b, and includes the same conductive material the same as that of the control electrode 105.

The pixel capacitor 202 includes the pixel electrode (first electrode or bottom electrode) 107, the common pixel electrode (second electrode or top electrode) 124 facing the pixel electrode 107, and the dielectric layer (reference numeral is omitted) formed between the pixel electrode 107 and the common pixel electrode 124. The pixel electrode 107 is electrically connected with the first electrode 103c of the sub-capacitor 203 through an intermediate interconnection 106a. The intermediate interconnection 106a is formed together with the video-signal line 106h(22) and includes the same conductive material as that of the video signal line 106h(22). That is, the intermediate interconnection 106a is disposed at the conductive layer above the control electrode 105 of the thin film transistor 201. The pixel electrode 107 is disposed at a conductive layer above the intermediate interconnection 106a.

The pixel electrode 107 can include an ITO (indium tin oxide) layer in practice. The dielectric layer of the pixel capacitor 202 includes a dielectric substance between the pixel electrode 107 and the common pixel electrode 124. The dielectric layer includes an alignment layer disposed at the insulating substrate 101, an alignment layer disposed at the opposite substrate 121 and liquid crystals 111 filled between both alignment layers. As shown in FIG. 3, a passivation layer 110 is formed on the insulating substrate 101, and the passivation layer 110 includes at least one of an interlayer dielectric layer formed between the control electrode 105 and the video signal line 106h, an interlayer dielectric layer formed between the intermediate interconnection 106a and the pixel electrode 107, and an uppermost alignment layer.

In addition, a color filter layer 122, an overcoat layer 123, the common pixel electrode 124, and a passivation layer 125 are sequentially stacked on the opposite substrate 121 (see, lower part of FIG. 3). Each of red, green and blue color filters is arranged on each pixel. Although the structure of the color filter layer 122 is not described in detail, the color filter layer 122 is provided with a black matrix layer and a colored layer having a red color, a green color or a blue color. The overcoat layer 123 is formed on the color filter layer 122.

The common pixel electrode 124 is formed on the overcoat layer 123, and the common pixel electrode 124 as well as the pixel electrode 107 may include an ITO layer. The passivation layer 125 includes an alignment layer.

Figure 1:
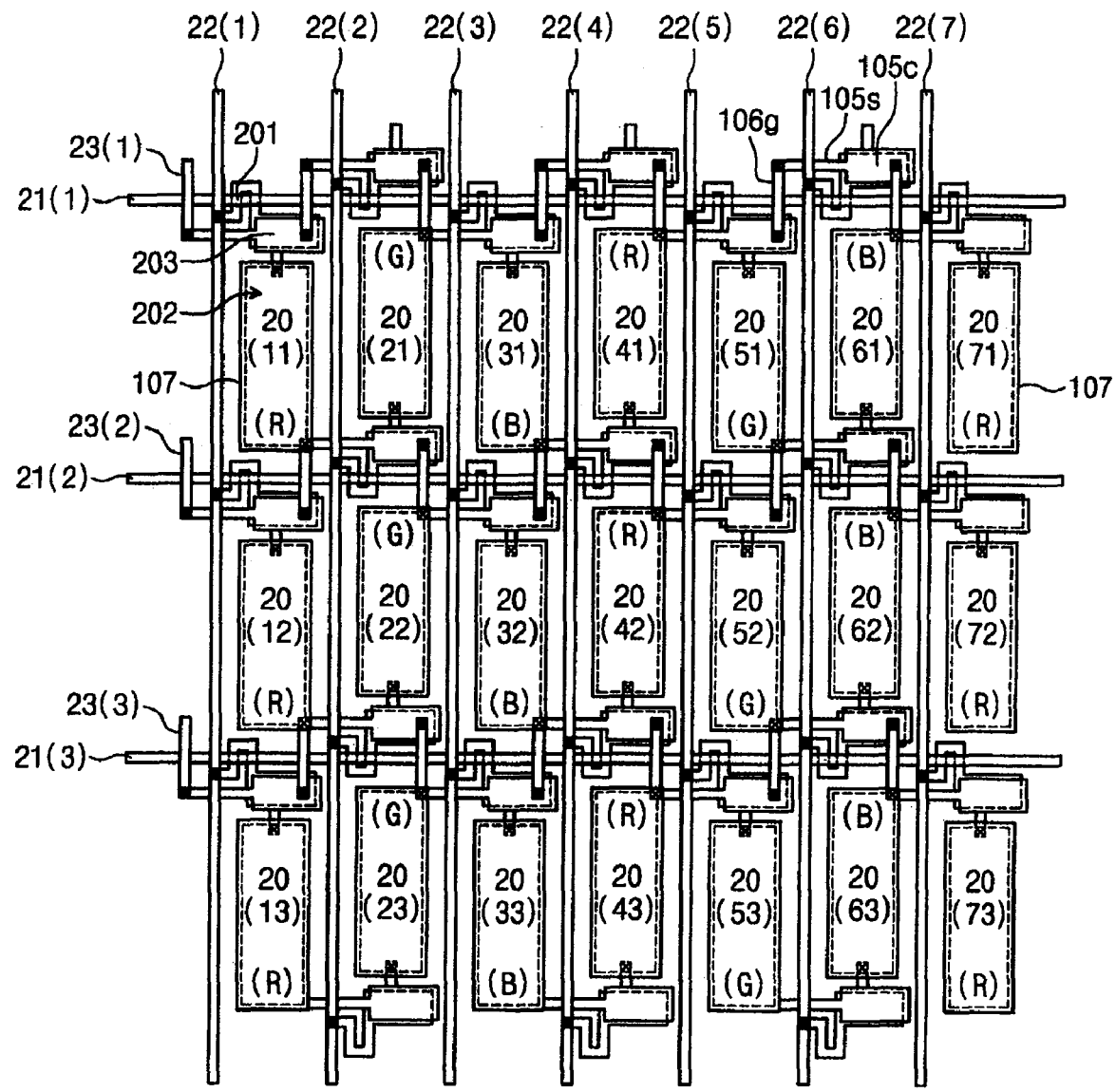
FIG. 1 is a plan view representing a main part of a liquid crystal display unit of a liquid crystal display according to a first embodiment of the present invention.
Figure 2:
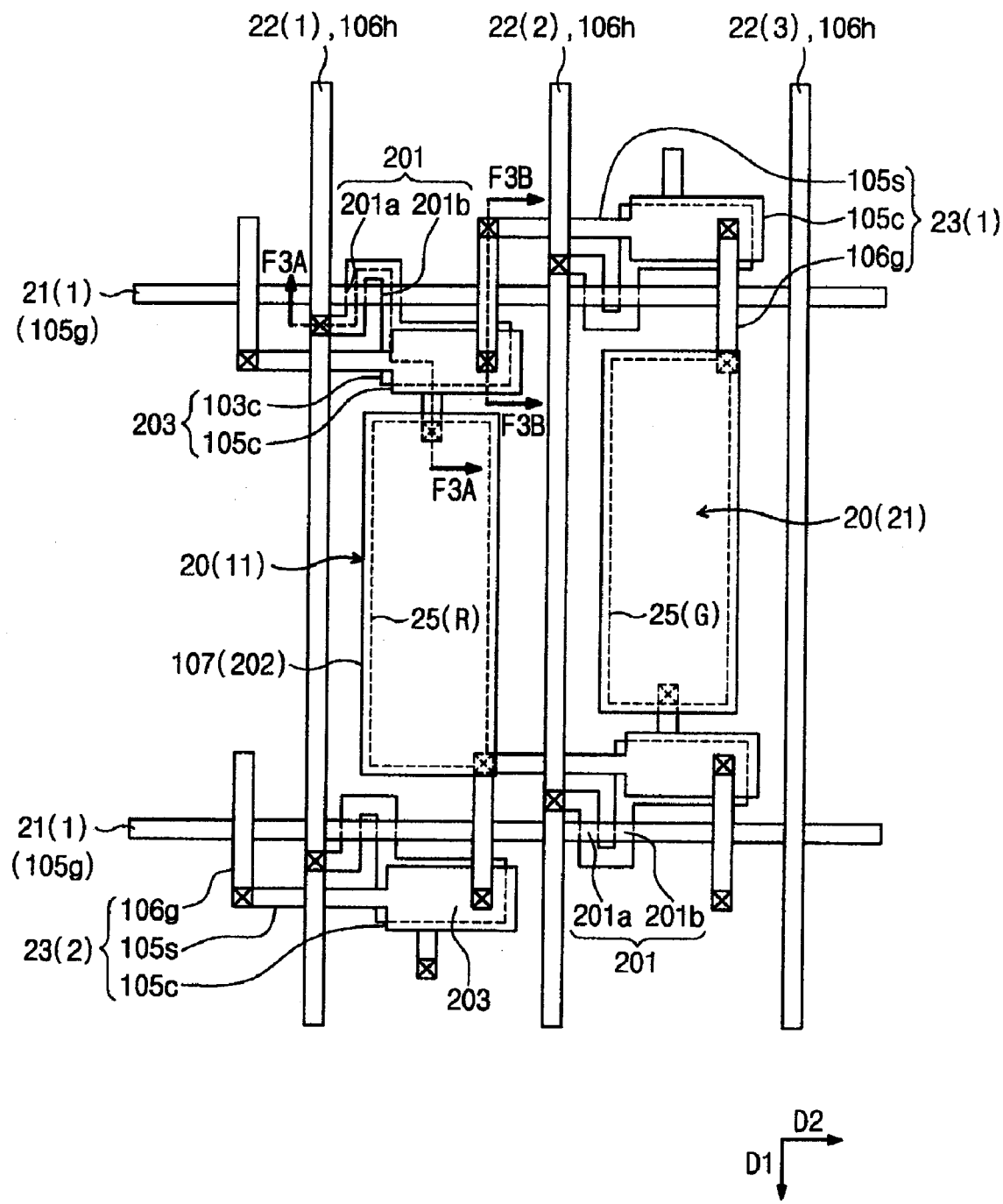
FIG. 2 is an enlarged plan view representing the liquid crystal display unit shown in FIG. 1.

As shown in FIGS. 1, 2 and 3, the control electrode 105 of the thin film transistor 201 is electrically connected to the vertical scan line 105g(21). The vertical scan line 105g and the control electrode 105 are formed of the same conductive layer, and include the same conductive material. That is, the vertical scan line 105g and the control electrode 105 are integrally formed. Particularly, as shown in FIGS. 1 and 2, the vertical scan line 105g linearly extends in the second direction D2 between the pixel electrode 107 of the pixel 20(11) and the sub-capacitor 203 of the pixel 20(12), between the sub-capacitor 203 of the pixel 20(21) and the pixel electrode 107 of the pixel 20(22), and between the pixel electrode 107 of the pixel 20(31) and the sub-capacitor 203 of the pixel 20(32), etc. That is, the sub-capacitors 203 are alternately and repeatedly arranged in the second direction D2 at upper/lower sides about the vertical scan line 105g at every pixel.

The sub-capacitor line 23 includes a connecting line 105s, the second electrode 105c of the sub-capacitor 203, and a cross line 106g crossing the vertical scan line 105g(21). The connecting lines 105s are alternately and repeatedly disposed at upper/lower sides about the vertical scan line 105g at every pixel and extend in the second direction D2. The connecting line 105s is spaced apart from the vertical scan line 105g by a predetermined interval, and extends parallel to the second direction D2. The connecting line 105s, the vertical scan line 105g and the second electrode 105c of the sub-capacitor 203 are formed of the same conductive layer, and includes the same conductive material. That is, the connecting line 105s is integrally formed with the second electrode 105c, and is electrically connected to the second electrode 105c.

The cross line 106g electrically connect the connecting line 105s disposed at the upper side of the vertical scan line 105g with the second electrode 105c disposed at the lower side of the vertical scan line 105g by crossing the vertical scan line 105g. In addition, the cross line 106g electrically connects the second electrode 105c disposed at the upper side of the vertical scan line 105g with the connecting line 105s disposed at the lower side of the vertical scan line 105g by crossing the vertical scan line 105g. The connecting line 106g and the video signal line 106h(22) are formed of the same conductive layer, and includes the same conductive material. That is, the sub-capacitor line 23 is formed by sequentially connecting the connecting line 105s, the second electrode 105c, the cross line 106g, the connecting line 105s, the second electrode 105c, the cross line 106g, etc.

Display Operation of Liquid Crystal Display

The liquid crystal display according to the first embodiment of the present invention is operated by the dot inversion drive mode, which will be described below with reference to FIGS. 1 to 5. The display operation of the liquid crystal display will be explained based on the color display operation of the pixel 20(12) on which the red, the green, and the blue color filter layer 122 are disposed.

Figure 5:
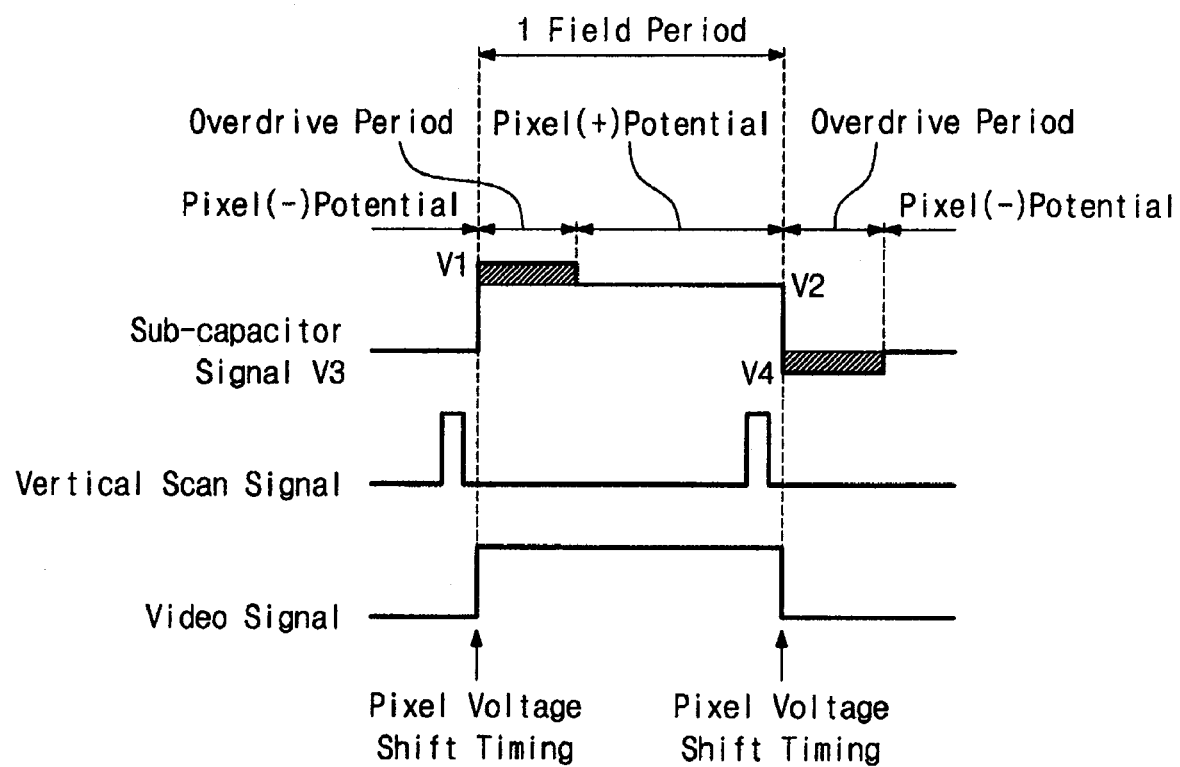
FIG. 5 is a time chart describing a display operation of the liquid crystal display according to the first embodiment of the present invention.

The control circuit 13 drives the vertical scan line drive circuit 11 so that the vertical scan line drive circuit 11 selects the vertical scan line 21(2). A vertical scan signal having a voltage pulse shown in FIG. 5 is provided to the selected vertical scan line 21(2). The vertical scan signal is applied to each control electrode 105 of the thin film transistors 201 of the pixels (20(21), 20(41), . . . ), which are disposed between the selected vertical scan line 21(2) and the upper vertical scan line 21(1) adjacent to the selected vertical scan line 21(2). Likewise, the vertical scan signal is applied to each control electrode 105 of the thin film transistors 201 of the pixels (20(12), 20(32), . . . ), which are disposed between the selected vertical scan line 21(2) and the lower vertical scan line 21(3) adjacent to the selected vertical scan line 21(2). The thin film transistor 201 is turned on as the vertical scan signal is applied thereto.

The control circuit 13 drives the video signal line drive circuit 12, and the video signal line drive circuit 12 selects the video signal line 22(1), 22(2) and 22(3). A video signal having a voltage pulse as shown in FIG. 5 is provided to the selected video signal line 22(1), 22(2) and 22(3). The voltage level of the video signal is changed depending on the display color and the gray scale. The video signal is provided to the main electrode 103 of the thin film transistor 201 of the pixel 20(12) connected to the video signal line 22(1), the main electrode 103 of the thin film transistor 201 of the pixel 20(21) connected to the video signal line 22(2), and the main electrode 103 of the thin film transistor 201 of the pixel 20(32) connected to the video signal line 22(3).

Since the thin film transistor 201 has been turned on, the video signal is transmitted to the pixel electrode 107 of the pixel 20(12) defined by the vertical scan line 21(2) and the video signal line 22(1); the pixel 20(21) defined by the vertical scan line 21(2) and the video signal line 22(2); and the pixel 20(32) defined by the vertical scan line 21(2) and the video signal line 22(3). In the pixels 20(12), 20(21) and 20(32), since the video signal is provided to the pixel electrode 107, the voltage between the pixel electrode 107 and the common pixel electrode 124 of the pixel capacitor 202 is varied, controlling the alignment of the liquid crystals and changing the transmittance of light passing through the liquid crystals 11 so that the image is displayed.

In synchronization with the selecting operation of the video signal line 22(1) to 22(3), the control circuit 13 drives the switching circuit 17 through each of the scan line shift register 14 and the sub-capacitor line timing generation circuit 15.

As shown in FIG. 5, the switching circuit 17 according to the first embodiment of the present invention provides the sub-capacitor line 23(2) with four sub-capacitor signals V1~V4 having different voltage levels generated by the voltage generation circuit 16. The signals are provided in a predetermined order during a predetermined period.

The sub-capacitor signal V3 has a certain voltage level when the sub-capacitor line 23(2) is not selected. The sub-capacitor signal V2 has a voltage level when the sub-capacitor line 23(2) is selected (during the first field period). The sub-capacitor signal V1 has a voltage level to positively overdrive the voltage level of the sub-capacitor signal V2 during an overdrive period. The sub-capacitor signal V4 has a voltage level to negatively overdrive the voltage level of the sub-capacitor signal V2 during an overdrive period such that the voltage level of the sub-capacitor signal V2 becomes lower than the voltage level of the sub-capacitor signal V3. That is, the sub-capacitor signal V1 has the highest voltage level and the voltage level is gradually lowered in the order of sub-capacitor signals V2, V3 and V4.

Accordingly, in the liquid crystal display 1, the sub-capacitor 203 is positively overdriven by the sub-capacitor signal V1 in synchronization with the video signal transmission to the pixel capacitor of the pixel 20, and the sub-capacitor 203 is negatively overdriven by the sub-capacitor signal V4 in synchronization with the end of the video signal transmission. Therefore, the alignment control (tilting control) of the liquid crystals can be performed at a high speed.

The display operation of the pixels 20(41), 20(52) and 20(61), which are aligned in the next row and connected to the vertical scan line 21(2) to which the pixels 20(12), 20(21) and 20(32) are connected, is performed simultaneously with the display operation of the pixels 20(12), 20(21) and 20(32). When the display operation of pixels 20 for one horizontal period ends, the pixels 20 connected to the next vertical scan line 21(3) adjacent to the vertical scan line 21(2) in the first direction D1 begins.

Characteristic of Liquid Crystal Display

As described above, the liquid crystal display 1 employing the dot inversion drive mode according to the first embodiment shown in FIGS. 1, 2 and 4 includes the sub-capacitor line 23. The sub-capacitor line 23 is disposed between the pixels 20 in which the vertical scan lines 21 are disposed and repeatedly crosses the vertical scan lines 21 at a predetermined interval, that is, at every pixel 20 (single dot), and extends in the second direction D2. Each sub-capacitor line 23 extends in the second direction D2 in a serpentine (zigzag) manner while repeatedly crossing the vertical scan line 21 extending in the second direction D2 between pixels 20 adjacent to each other in the first direction D1. The liquid crystal display 1 having the above structure is provided with a single sub-capacitor line 23 corresponding to a single vertical scan line 21, and the number of the sub-capacitor lines 23 extending on the liquid crystal display unit 10, particularly, the number of the sub-capacitor lines 23 crossing the pixels 20 can be decreased, thereby improving the aperture ratio and the light transmittance of the pixel 20.

In the liquid crystal display according to the first embodiment of the present invention, as shown in FIGS. 2 and 3, the sub-capacitor line 23 includes the connecting line 105s, the second electrode 105c of the sub-capacitor 203 and the cross line 106g. The connecting line 105s, the second electrode 105c and the vertical scan line 105g(21) are formed of the same conductive layer, and include the same conductive material. The cross line 106g and the video signal line 106h(22) are formed of the same conductive layer, and include the same conductive material. Accordingly, an additional conductive layer is not needed in the liquid crystal display 1, and additional steps are not needed in the manufacturing process. Therefore, the sub-capacitor line 23 capable of improving the light transmittance of the pixel 20 can be easily realized by simply changing the layout.

Second Embodiment

In the second embodiment of the present invention, the crossing interval between the vertical scan line 21 and the sub-capacitor line 23 is changed as compared with the liquid crystal display employing the dot inversion drive mode described above. In the second embodiment and the third embodiment to be described below, the same reference numerals will be assigned to the same elements of the first embodiment of the present invention and detailed description thereof will be omitted.

Arrangement Layout of Pixels of Second Embodiment

Figure 6:
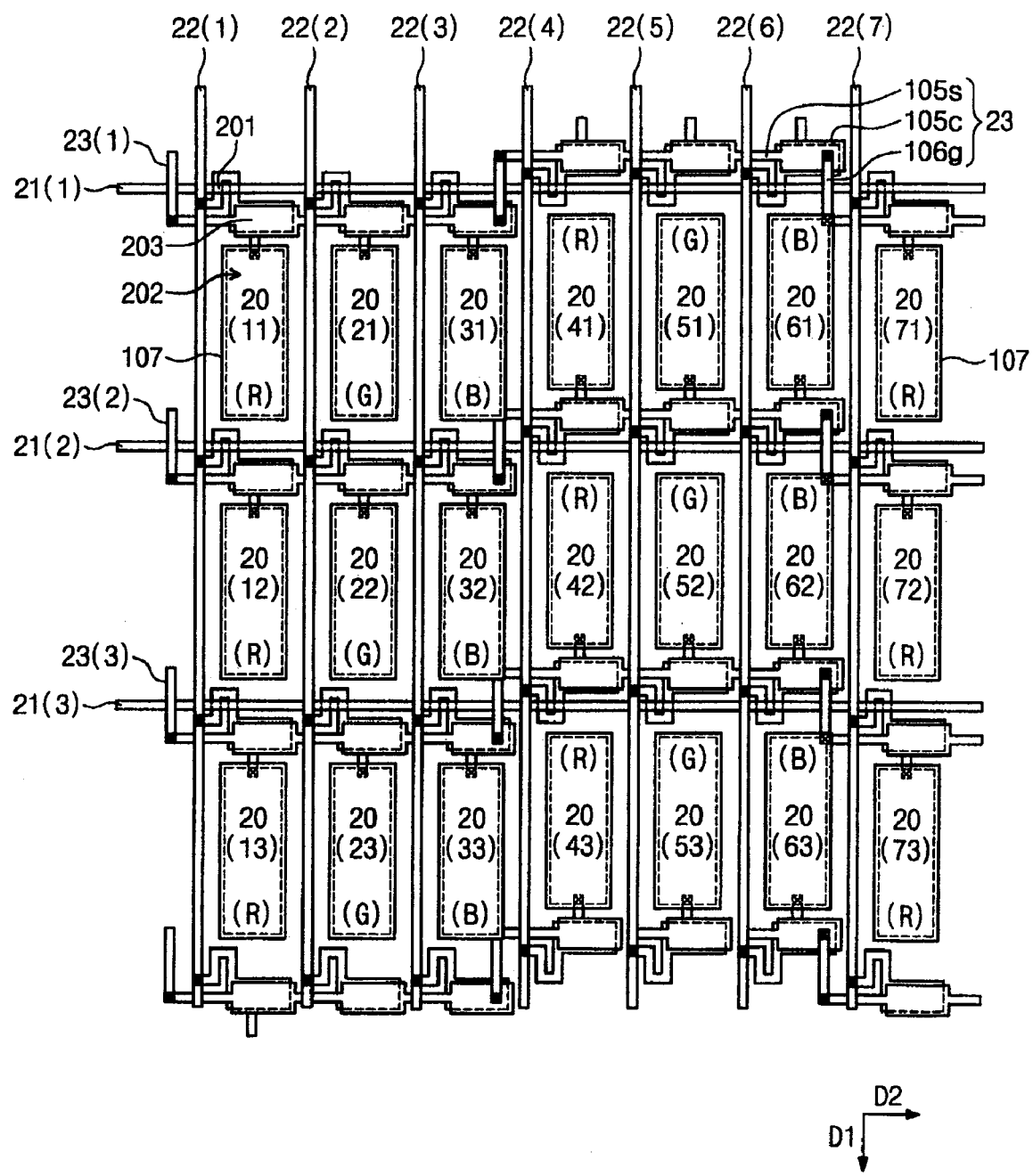
FIG. 6 is a plan view representing a main part of the liquid crystal display unit of the liquid crystal display according to a second embodiment of the present invention.
Figure 7:
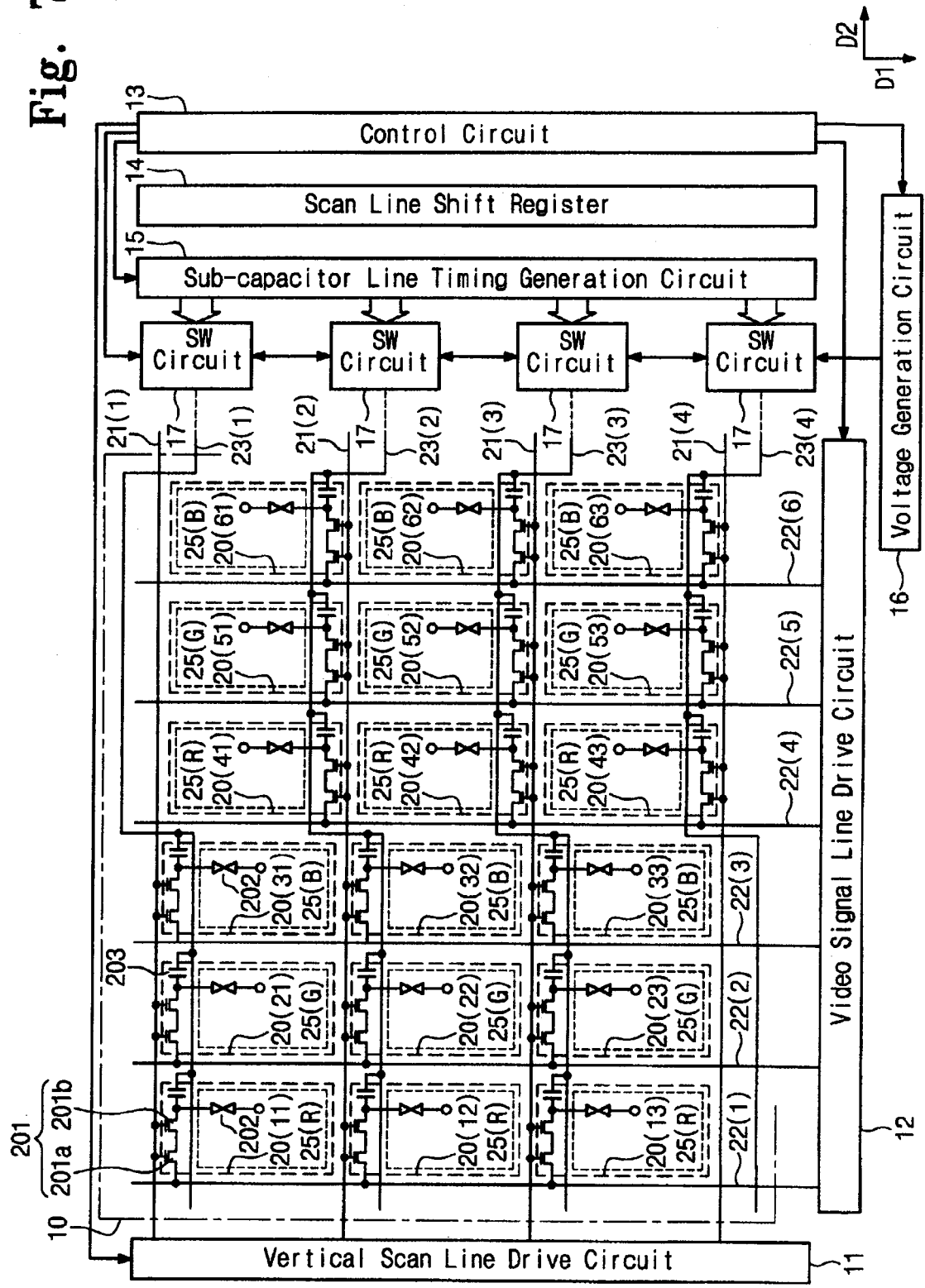
FIG. 7 is a system circuit diagram of the liquid crystal display according to the second embodiment of the present invention.

As shown in FIGS. 6 and 7, in the liquid crystal display unit 10 of the liquid crystal display 1 according to the second embodiment of the present invention, three pixels 20(11), 20(21) and 20(31), which are arranged in the second direction D2, are connected to one vertical scan line 21(1), and three pixels 20(41), 20(51) and 20(61), which are arranged in the second direction D2, are connected to the other vertical scan line 21(2) between the vertical scan lines 21(1) and 21(2) that are adjacent to each other in the first direction D1. That is, pixels (20(11), 20(21), 20(31), 20(41) . . . ) are alternately connected to one side and the other side of the vertical scan line 21 at every three pixels.

The liquid crystal display 1 according to the second embodiment of the present invention displays a color image, so that a color filter 25 is disposed on each pixel 20. The color filters of red (R), green (G) and blue (B) are assigned to the pixels 20(11), 20(21) and 20(31) that are arranged in the second direction D2, respectively. Three pixels 20(11), 20(21) and 20(31) form a single pictures element. Likewise, the color filters of red (R), green (G) and blue (B) are again assigned to the pixels 20(41), 20(51) and 20(61) that are arranged in the second direction D2, respectively. The color filters of red (R) are assigned to the pixels (20(11), 20(12), . . . ) that are arranged in the first direction D1, respectively. The color filters of green (G) are assigned to the pixels 20(21), 20(22), . . . ), respectively. The color filters of blue (B) 25 are assigned to the pixels 20(31), 20(32), . . . ), respectively.

The connection relationship of the pixels (20(12), 20(22), 20(32), 20(42), 20(52), 20(62) . . . ) arranged between the vertical scan lines 21(2) and 21(3) of the next row, which are adjacent to each other in the first direction D1, is identical to the connection relationship of the pixels in the previous row. That is, the three pixels 20(12), 20(22) and 20(32) that are arranged in the second direction D2 are connected to one vertical scan line 21(2), and the pixels 20(42), 20(52) and 20(62) are connected to the other vertical scan line 21(3). The connection relationship of the pixels 20 arranged between the vertical scan lines 21 at the following rows is identical to the connection relationship of the pixels in the previous rows.

In the region between the video signal lines 22(1) and 22(2), which are adjacent to each other in the second direction D2, the pixels (20(11), 20(12), . . . ) that are arranged in the first direction D1 are connected to one video signal line 22(1). In the region between the video signal lines 22(2) and 22(3) of the next column, which are adjacent to each other in the second direction D2, the pixels (20(21), 20(22), . . . ) that are arranged in the first direction D1 are connected to the other video signal line 22(2). The connection relationship of the pixels 20 arranged between the video signal lines 22 at the following columns is identical to that of the previous columns.

In the liquid crystal display 1 employing the dot inversion drive mode according to the second embodiment of the present invention having the above structure, the sub-capacitor line 23 is disposed in the region between pixels 20 in which the corresponding vertical scan lines 21 are disposed, and extends in the second direction D2 while regularly and repeatedly crossing the corresponding vertical scan line 21. For example, the sub capacitor 23(2) is disposed in the region between pixels 20(11) and 20(12) in which the vertical scan line 21(2) is disposed, and regularly crosses the vertical scan line 21(2). Particularly, as shown in FIG. 6, the vertical scan line 21(2) linearly extends in the second direction D2 between each pixel electrode 107 of three pixels 20(11), 20(21) and 20(31) and each sub-capacitor 203 of three pixels 20(12), 20(22) and 20(32), and between each sub-capacitor 203 of three pixels 20(41), 20(51) and 20(61) and each pixel electrode 107 of three pixels 20(42), 20(52) and 20(62).

That is, the sub-capacitors 203 are alternately and repeatedly arranged at upper/lower sides about the vertical scan line 21(2) in the second direction D2 at every three pixels. The detailed sectional structure of the sub-capacitor 23 is the same as that of the sub-capacitor 23 shown in FIG. 3 according to the first embodiment of the present invention. The sub-capacitor line 23 includes a connecting line 105s, the second electrode 105c of the sub-capacitor 203, and a cross line 106g crossing the vertical scan line 21. That is, in the liquid crystal display according to the second embodiment of the present invention, the sub-capacitor line 23 repeatedly crosses the vertical scan line 21 at every three pixels 20 or at every picture element, and extends in the second direction D2.

Characteristic of Liquid Crystal Display

Referring to FIGS. 6 and 7, the liquid crystal display 1 employing the dot inversion drive mode according to the second embodiment of the present invention includes the sub-capacitor line 23. The sub-capacitor line is disposed between the pixels 20 in which the vertical scan lines 21 are disposed. The sub-capacitor line 23 repeatedly crosses the vertical scan lines 21 at a predetermined interval, that is, at every three pixels 20 (three dots) or every single picture element, and extends in the second direction D2. Each sub-capacitor line 23 extends in the second direction D2 in a serpentine (zig-zag) manner while repeatedly crossing the vertical scan line 21 extending in the second direction D2 between pixels 20 adjacent to each other in the first direction D1. The liquid crystal display 1 having the above structure is provided with one sub-capacitor line 23 corresponding to a single vertical scan line 21, and the number of the sub-capacitors lines 23 extending on the liquid crystal display unit 10, that is, the number of the sub-capacitor lines 23 crossing the pixels 20 can be decreased, thereby improving the aperture ratio and the light transmittance of the pixel 20.

Since the sub-capacitor line 23 repeatedly crosses the vertical scan line 21 at every three pixels or every single picture element, the number of the cross lines 106g of the sub-capacitor 23 is decreased by ⅓ as compared with the number of cross lines 106g of the sub-capacitor 23 according to the first embodiment of the present invention.

Similar to the liquid crystal display according to the first embodiment of the present invention, in the liquid crystal display according to the second embodiment of the present invention, the connecting line 105s, the second electrode 105c and the vertical scan line 105g(21) are formed of the same conductive layer, and include the same conductive material. The cross line 106g and the video signal line 106h (22) are formed of the same conductive layer, and include the same conductive material. Accordingly, the sub-capacitor 23 capable of improving the light transmittance of the pixel 20 can be easily realized by simply changing the layout.

Third Embodiment

The third embodiment is different from the liquid crystal display employing the dot inversion drive mode according to the second embodiment in that the vertical scan line 21 alternately and repeatedly extends in a serpentine manner with respect to the sub-capacitor 23.

Figure 8:
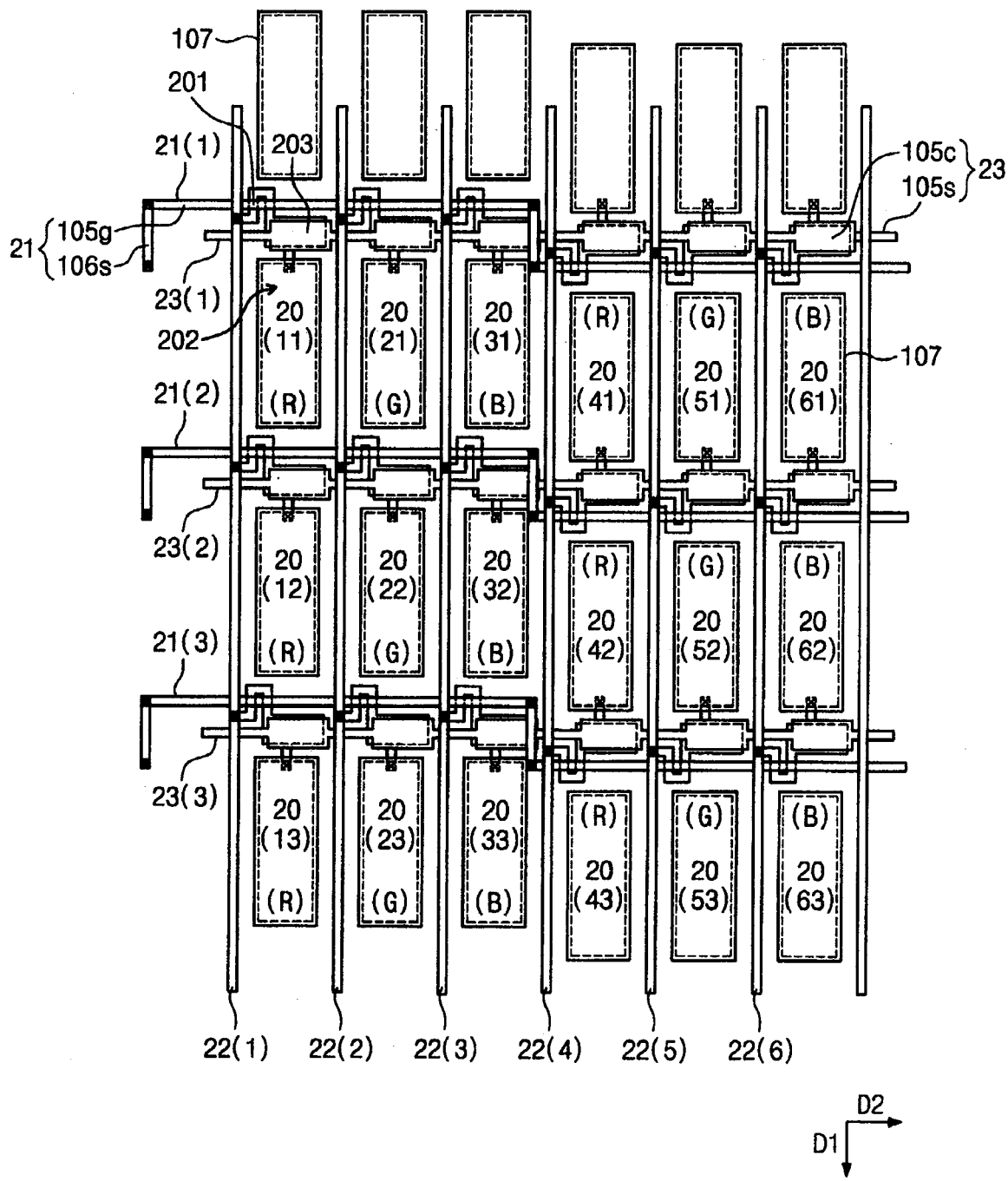
FIG. 8 is a plan view representing a main part of the liquid crystal display unit of the liquid crystal display according to a third embodiment of the present invention.
Figure 9:
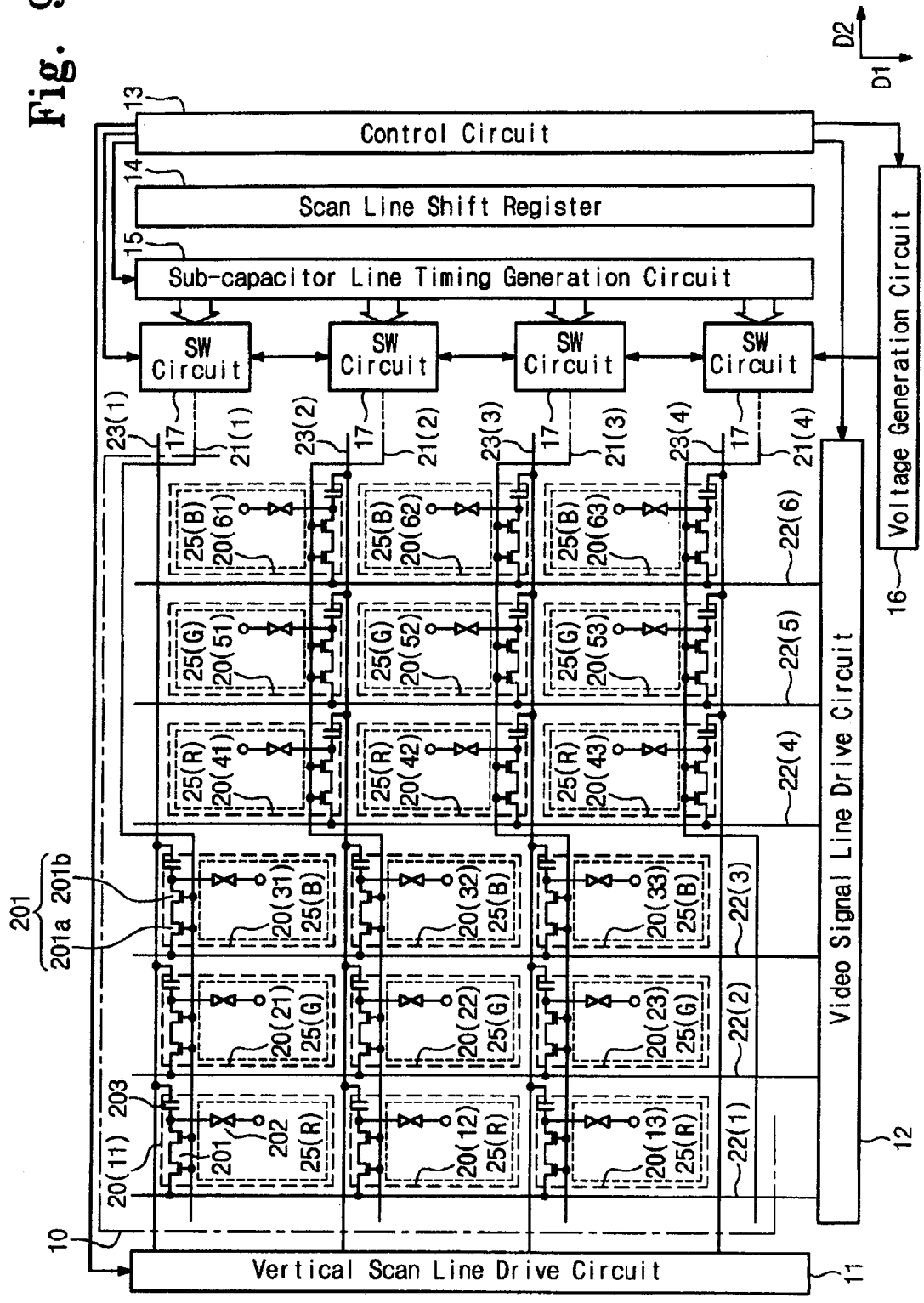
FIG. 9 is a system circuit diagram of the liquid crystal display according to the third embodiment of the present invention.

Arrangement Layout of Pixel and Detailed Plan Structure of Liquid Crystal Display As shown in FIGS. 8 and 9, in the liquid crystal display unit 10 according to the third embodiment, three pixels 20(11), 20(21) and 20(31) arranged in the second direction D2 are connected to one vertical scan line 21(1), and three pixels 20(41), 20(51) and 20(61), which are arranged in the second direction D2, are connected to the other vertical scan line 21(2) between the vertical scan lines 21(1) and 21(2) that are adjacent to each other in the first direction D1. That is, pixels (20(11), 20(21), 20(31), 20(41) . . . ) are alternately connected to one side and the other side of the vertical scan line 21 at every three pixels (at every three dots).

Furthermore, the liquid crystal display 1 according to the second embodiment displays a color image, so that a color filter 25 is disposed on each pixel 20. The color filters of red (R), green (G) and blue (B) are assigned to the pixels 20(11), 20(21) and 20(31) that are arranged in the second direction D2, respectively. Three pixels 20(11), 20(21) and 20(31) form a single picture element. Likewise, the color filters of red (R), green (G) and blue (B) are again assigned to the pixels 20(41), 20(51) and 20(61) that are arranged in the second direction D2, respectively. The color filters of red (R) are assigned to the pixels (20(11), 20(12), . . . ) that are arranged in the first direction D1, respectively. The color filters of green (G) are assigned to the pixels (20(21), 20(22), . . . ), respectively. The color filters of blue (B) are assigned to the pixels (20(31), 20(32), . . . ), respectively.

The connection relationship of the pixels (20(12), 20(22), 20(32), 20(42), 20(52), 20(62) . . . ) arranged between the vertical scan lines 21(2) and 21(3) of the next row, which are adjacent to each other in the first direction D1, is the same as the connection relationship of the pixels of the previous rows. That is, the three pixels 20(12), 20(22) and 20(32) that are arranged in the second direction D2 are connected to one vertical scan line 21(2), and the pixels 20(42) and 20(52) and 20(62) are connected to the other vertical scan line 21(3). The connection relationship of the pixels 20 arranged between the vertical scan lines 21 in the following rows is the same as the connection relationship of the pixels arranged in the previous rows.

In the region between the video signal lines 22(1) and 22(2), which are adjacent to each other in the second direction D2, the pixels (20(11), 20(12), . . . ), which are arranged in the first direction D1, are connected to one video signal line 22(1). In the region between the video signal lines 22(2) and 22(3), which are adjacent to each other in the second direction D2, the pixels (20(21), 20(22), . . . ) that are arranged in the first direction D1 are connected to the other video signal line 22(2). The connection relationship of the pixels 20 arranged between the video signal lines 22 in the following columns is the same as that of the pixels arranged in the previous columns.

In the liquid crystal display 1 employing the dot inversion drive mode according to the third embodiment having the above structure, the sub-capacitor line 23 is disposed in the region between pixels 20 in which the corresponding vertical scan line 21 is disposed, and extends in the second direction D2 while regularly and repeatedly crossing the corresponding vertical scan line 21. For example, the sub capacitor 23(2) is disposed on a region between pixels 20(11) and 20(12), in which the vertical scan line 21(2) is disposed, and regularly crosses the vertical scan line 21(2).

Particularly, as shown in FIG. 8, the vertical scan line 21(2) extend in the second direction D2 between each pixel electrode 107 of three pixels 20(11), 20(21) and 20(31) and each sub-capacitor 203 of three pixels 20(12), 20(22) and 20(32), and between each sub-capacitor 203 of three pixels 20(41), 20(51) and 20(61) and each pixel electrode 107 of three pixels 20(42), 20(52) and 20(62). Different from the liquid crystal display of the second embodiment, in the liquid crystal display according to the third embodiment, the sub-capacitor line 23 linearly extends, and the vertical scan line 21 extends in the second direction D2 while alternately and repeatedly crosses the sub-capacitor line 23. That is, the vertical scan lines 21(2) are alternately arranged at upper/lower sides about the sub-capacitor 203 at every three pixels 20 in the second direction D2.

The detailed sectional structure of the sub-capacitor 23 is similar to the sub-capacitor 23 of the liquid crystal display 1 according to the first embodiment shown in FIG. 3. The sub-capacitor line 23 includes a connecting line 105s, and a second electrode 105c of the sub-capacitor 203. The connecting line 105s and the second electrode 105c are repeatedly disposed in the second direction D2. The sub-capacitor line 23 is integrally formed with the connecting line 105s and the second electrode 105c. The vertical scan line 21 includes vertical scan lines 105g and cross lines 106s. The vertical scan lines 105g are alternately disposed at upper/lower sides about the sub-capacitor line 23 at every three pixels or at every picture element. The cross lines 106s connect the upper vertical scan line 105g to the lower vertical scan line 105g by crossing the sub-capacitor 23, particularly, the second electrode 105c. The cross lines 106s and the video signal lines 22 are formed as a same conductive layer and include a same conductive material.

Characteristic of Liquid Crystal Display

Referring to FIGS. 8 and 9, the liquid crystal display 1 employing the dot inversion drive mode according to the third embodiment includes sub-capacitor line 23. Sub-capacitor line 23 is disposed between the pixels 20 in which the vertical scan lines 21 are disposed. In addition, the sub-capacitor line 23 repeatedly crosses the vertical scan lines 21 at a predetermined interval, that is, at every three pixels 20 (three dots) or every single picture element, and extends in the second direction D2. Each vertical scan line 21 between adjacent pixels 20 in the first direction D1 extends in the second direction D2 in a serpentine (zig-zag) manner while repeatedly crossing the sub-capacitor line 23 extending in the second direction D2.

The liquid crystal display 1 having the above structure is provided with one sub-capacitor line 23 corresponding to a single vertical scan line 21, and the number of the sub-capacitors lines 23 extending in the liquid crystal display unit 10, that is, the number of the sub-capacitor lines 23 crossing the pixels 20 can be decreased, thereby improving the aperture ratio and the light transmittance of the pixel 20. In addition, since the vertical scan line 21 repeatedly crosses the sub-capacitor line 23 at every three pixels or every single picture element, the number of the cross lines 106s of the vertical scan line 21 in the second direction D2 can be decreased.

In the liquid crystal display according to the third embodiment, since the vertical scan line 21 extends in a serpentine (zig-zag) manner and the sub-capacitor 23 determining the charge of the pixel capacitor 202 of the pixel 20 (that is, the potential applied to the pixel electrode 107) I extends linearly, the parasitic capacity or parasitic resistance applicable to the sub-capacitor can be reduced.

Further, the connecting line 105s, the second electrode 105c and the vertical scan line 105g(21) are formed of the same conductive layer and include the same material. The cross line 106s of the vertical scan line 21 and the video signal line 22 are formed as a same conductive layer and include a same material. Therefore, the sub-capacitor 23 capable of improving the light transmittance of the pixel 20 can be easily realized by simply changing the layout.

Other Embodiments

The present invention is not limited to the above embodiments. For example, the present invention can be applied to an organic electro luminescence display device employing the active matrix mode and the dot inversion drive mode.

According to the present invention, the liquid crystal display can improve the aperture ratio of the pixel and the light transmittance of the pixel.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A liquid crystal display comprising:
a plurality of pixels arranged in an array;
a plurality of vertical scan lines that are gate signal lines disposed between adjacent pixels;
a plurality of video signal lines disposed between adjacent pixels; and
a plurality of sub-capacitor lines disposed between adjacent pixels and collectively extending in the same direction as the vertical scan lines while regularly and repeatedly crossing the vertical scan lines.

2. The liquid crystal display of claim 1, wherein each sub-capacitor line extends in a serpentine manner with respect to each vertical scan line, and repeatedly crosses each vertical scan line.

3. The liquid crystal display of claim 1, wherein each vertical scan line extends in a serpentine manner with respect to each sub-capacitor line, and repeatedly crosses each sub-capacitor line.

4. The liquid crystal display of claim 1, wherein each vertical scan line repeatedly crosses each sub-capacitor line at every pixel.

5. The liquid crystal display of claim 1, wherein each vertical scan line repeatedly crosses each sub-capacitor line at every three pixels.

6. The liquid crystal display of claim 1, wherein each vertical scan line repeatedly crosses each sub-capacitor line at every picture element.

7. A liquid crystal display comprising:
an array of pixels;
a plurality of vertical scan lines disposed between adjacent pixels arranged in a first conductive layer;
a plurality of video signal lines disposed between adjacent pixels arranged in a second conductive layer;
a plurality of sub-capacitor lines disposed between adjacent pixels arranged in the first conductive layer; and
a plurality of cross lines for connecting the vertical scan lines and the sub-capacitor lines to repeatedly cross each other at a predetermined interval and arranged in the second conductive layer.

8. The liquid crystal display of claim 7, wherein each sub-capacitor line alternately extends at both sides of each vertical scan line in the second direction.

9. The liquid crystal display of claim 7, wherein each vertical scan line alternately extends at both sides of each sub-capacitor line in the second direction.

10. The liquid crystal display of claim 7, wherein each vertical scan line repeatedly crosses each sub-capacitor line at every pixel.

11. The liquid crystal display of claim 7, wherein each vertical scan line repeatedly crosses each sub-capacitor line at every three pixels.

12. The liquid crystal display of claim 7, wherein each of the vertical scan line repeatedly crosses each sub-capacitor line at every picture element.

13. A liquid crystal display comprising:
a plurality of pixels each having a thin film transistor,
a pixel electrode connected to a main electrode of the thin film transistor and a sub-capacitor electrically connected between the thin film transistor and the pixel electrode;
a plurality of vertical scan lines disposed between adjacent pixels arranged in a first conductive layer and electrically connected to alternately arranged control electrodes of thin film transistors at upper and lower pixel regions with respect to each vertical scan line;
a plurality of video signal lines disposed between adjacent pixels electrically connected to another electrode of each thin film transistor, and arranged in a second conductive layer above the first conductive layer;
a plurality of sub-capacitor lines disposed between adjacent pixels; and
a plurality of cross lines for connecting the vertical scan lines and the sub-capacitor lines to regularly and repeatedly cross each other arranged at the second conductive layer.

14. The liquid crystal display of claim 13, wherein one electrode of the sub-capacitor and the two electrodes of the thin film transistor are arranged in the second conductive layer, and the other electrode of the sub-capacitor and the control electrode of the thin film transistor are arranged in the first conductive layer.

15. The liquid crystal display of claim 13, wherein the sub-capacitor lines include first and second lines that are electrically connected through the cross lines and respectively positioned at upper pixel region and lower pixel region with respect to each vertical scan line.

16. The liquid crystal display of claim 13, wherein the vertical scan lines include first and second lines that are electrically connected through the cross lines and respectively positioned at upper pixel region and lower pixel region with respect to each sub-capacitor line.

17. The liquid crystal display of claim 13, wherein each vertical scan line repeatedly crosses each sub-capacitor line at every pixel.

18. The liquid crystal display of claim 13, wherein each vertical scan line repeatedly crosses each sub-capacitor line at every three pixels.

19. The liquid crystal display of claim 13, wherein each vertical scan line repeatedly crosses each sub-capacitor line at every picture element.

20. The liquid crystal display of claim 13, wherein the vertical scan lines and the sub-capacitor lines consist of a single layer including one selected from the group consisting of silicon layer, a metal layer having a high-melting point, a metal silicide layer having a high-melting point, a MoW layer and an aluminum alloy layer, or includes a composite layer obtained by combining at least two of the silicon layer, the metal layer, the metal silicide layer, the MoW layer and the aluminum alloy layer, and the video scan lines and the cross lines include a single layer of the aluminum alloy layer or a composite layer having the aluminum alloy layer as a main component.

21. The liquid crystal display of claim 13, wherein the liquid crystal display employs dot inversion driving at every pixel, every three pixels or every single picture element.

22. The liquid crystal display of claim 13, wherein the liquid crystal display is overdriven by the sub-capacitor during a predetermined period from beginning of a video signal transmission to the pixel or during a predetermined period from an end of the video signal transmission to the pixel.

23. A liquid crystal display comprising:
a first substrate having a plurality of pixels;
a vertical scan line formed on a first substrate;
a sub-capacitor line formed on the first substrate and spaced apart from the vertical scan line;
a plurality of video signal lines formed on the vertical scan line so as to define the pixels together with the vertical scan line; and
a second substrate facing the first substrate;
wherein the pixels are classified as a first group and a second group with respect to a virtual line parallel to a first direction, and the vertical scan line or the sub-capacitor line extends in a serpentine manner with respect to the virtual line between the first group and the second group.

24. The liquid crystal display of claim 23, wherein the vertical scan line extends in the serpentine manner with respect to the virtual line, and comprises:
a first vertical scan line corresponding to the first group;
a second vertical scan line corresponding to the second group; and
a cross line which connects the first and second vertical scan lines and is arranged in the same layer together with the video signal line.

25. The liquid crystal display of claim 24, wherein the first direction and the second direction are perpendicular to each other, and the cross line is parallel to the second direction.

26. The liquid crystal display of claim 23, wherein the sub-capacitor extends in the serpentine manner with respect to the virtual line, and comprises:
a first sub-capacitor line corresponding to the first group;
a second sub-capacitor line corresponding to the second group; and
a cross line which connects the first and second vertical scan lines and is arranged at a same layer together with the video signal line.

27. The liquid crystal display of claim 26, wherein the first direction and the second direction are perpendicular to each other, and the cross line is parallel to the second direction.

* * * * *